US008996021B2

(12) United States Patent
Cho et al.

(10) Patent No.: US 8,996,021 B2
(45) Date of Patent: Mar. 31, 2015

(54) METHOD AND DEVICE FOR TRANSMITTING/RECEIVING IDENTIFIER FOR NO-MOBILITY MOBILE STATION IN IDLE STATE IN WIRELESS COMMUNICATION SYSTEM

(75) Inventors: Heejeong Cho, Anyang-si (KR); Youngsoo Yuk, Anyang-si (KR); Eunjong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 69 days.

(21) Appl. No.: 13/811,647

(22) PCT Filed: Jul. 22, 2011

(86) PCT No.: PCT/KR2011/005430
§ 371 (c)(1),
(2), (4) Date: Jan. 22, 2013

(87) PCT Pub. No.: WO2012/011776
PCT Pub. Date: Jan. 26, 2012

(65) Prior Publication Data
US 2013/0122922 A1    May 16, 2013

Related U.S. Application Data

(60) Provisional application No. 61/366,533, filed on Jul. 22, 2010, provisional application No. 61/367,461, filed on Jul. 26, 2010.

(30) Foreign Application Priority Data

Jul. 22, 2011  (KR) .................. 10-2011-0072947

(51) Int. Cl.
*H04W 72/04* (2009.01)
*H04W 8/08* (2009.01)

(52) U.S. Cl.
CPC ............... *H04W 72/04* (2013.01); *H04W 8/08* (2013.01)
USPC ........ 455/450; 455/458; 455/422.1; 370/327; 370/328; 370/398

(58) Field of Classification Search
CPC ...... H04W 68/00; H04W 72/04; H04W 52/02
USPC ........ 455/458, 450, 422.1; 370/327, 328, 398
See application file for complete search history.

(56) References Cited

U.S. PATENT DOCUMENTS

| 2008/0056261 A1* | 3/2008 | Osborn et al. ............... 370/392 |
| 2008/0119209 A1* | 5/2008 | Upp ............................. 455/458 |
| 2010/0061308 A1* | 3/2010 | Becker et al. ................ 370/328 |

FOREIGN PATENT DOCUMENTS

| CN | 1671071 | 9/2005 |
| CN | 101543124 | 9/2009 |
| KR | 1020080079961 | 9/2008 |

OTHER PUBLICATIONS

Intel Corporation, "Methods to Identify Idle Mode MSs in IEEE 802.16m (16.2.18)," IEEE 802.16 Broadband Wireless Access Working Group, IEEE C802.16m-10/0679r2, May 2010, 2 pages.
(Continued)

*Primary Examiner* — Kashif Siddiqui
*Assistant Examiner* — Farideh Madani
(74) *Attorney, Agent, or Firm* — Lee, Hong, Degerman, Kang & Waimey

(57) ABSTRACT

Disclosed are a method and a device for transmitting/receiving an identifier for a no-mobility mobile station in an idle state in a wireless communication system. In a base station device for transmitting an identifier for a no-mobility mobile station in an idle state, according to the present invention, a receiver receives information on mobility from at least one mobile station. A processor allocates, to the at least one no-mobility mobile station in an idle state, at least one identifier for a no-mobility mobile station in an idle state for a no-mobility mobile station in an idle state on the basis of the information on mobility. A transmitter transmits the allocated identifier to the at least one no-mobility mobile station in an idle state.

10 Claims, 5 Drawing Sheets

(56) References Cited

OTHER PUBLICATIONS

Itri, "AMS Identifier in the DCR Mode (16.2.18)," IEEE 802.16 Broadband Wireless Access Working Group, IEEE C802.16m-09/2793r1, Dec. 2009, 4 pages.
Itri, et al., "Enhanced network reentry from idle mode for M2M devices without mobility," IEEE 802.16 Broadband Wireless Access Working Group, IEEE C80216p-11/00181r1, Jul. 2011, 8 pages.
PCT International Application No. PCT/KR2011/005430, The International Search Report dated Dec. 28, 2011, 9 pages.
PCT International Application No. PCT/KR2011/005430, The International Search Report dated Dec. 28, 2011, 16 pages.
The State Intellectual Property Office of the People's Republic of China Application Serial No. 201180035918.4, Office Action dated Sep. 28, 2014, 6 pages.

* cited by examiner

METHOD AND DEVICE FOR TRANSMITTING/RECEIVING IDENTIFIER FOR NO-MOBILITY MOBILE STATION IN IDLE STATE IN WIRELESS COMMUNICATION SYSTEM

CROSS-REFERENCE TO RELATED APPLICATIONS

This application is the National Stage filing under 35 U.S.C. 371 of International Application No. PCT/KR2011/005430, filed on Jul. 22, 2011, which claims the benefit of earlier filing date and right of priority to Korean Patent Application No. 10-2011-0072947, filed on Jul. 22, 2011, and also claims the benefit of U.S. Provisional Application Serial No. 61/366,533, filed on Jul. 22, 2010, and U.S. Provisional Application Serial No. 61/367,461, filed on Jul. 26, 2010, the contents of which are all hereby incorporated by reference herein in their entirety.

FIELD OF THE INVENTION

The present invention relates to wireless communication, and more particularly to a method and apparatus for transmitting/receiving an identifier (ID) for an idle-state MS having no mobility in a wireless communication system.

BACKGROUND ART

A broadband wireless communication system is based on an orthogonal frequency division multiplexing (OFDM) scheme and an orthogonal frequency division multiple access (OFDMA) scheme, and transmits a physical channel signal using a plurality of subcarriers so as to implement high-speed data transmission.

Downlink data types transmitted from a base station (BS) to a mobile station (MS) can be largely classified into a multicasting/broadcasting data type and a unicast type. The multicasting/broadcasting data type can be used for the BS to transmit system information, configuration information, software update information, etc. to one or more groups including unspecific/specific MSs. The unicast data type may be used for the BS to transmit requested information to a specific MS, or may also be used to transmit a message including information (for example, configuration information) to be transferred only to a specific MS.

Meanwhile, uplink data types transmitted from an MS to a BS or another MS may include a unicast data type. The MS can finally transmit a message including specific information to be transferred to another MS or a server to the BS.

Although typical communication is mainly based on communication between an MS and a BS, Machine to Machine (M2M) communication is made available because of rapid development of communication technologies. Machine-to-machine (M2M) communication is communication between electronic devices as the name implies. While M2M communication means wired or wireless communication between electronic devices or communication between a human-controlled device and a machine in the broadest sense, these days M2M communication typically refers to wireless communication between electronic devices.

When the concept of M2M communication was introduced in the early 1990s, it was regarded merely as the concept of remote control or telematics and the market therefor was very limited. However, M2M communication has been rapidly developed and the M2M communication market has attracted much attention all over the world over the past few years. Especially, M2M communication has a great influence in the fields of fleet management, remote monitoring of machines and facilities, smart metering for automatically measuring the working time of construction equipment and the consumption of heat or electricity, etc. in the Point Of Sales (POS) market and security-related applications. It is expected that M2M communication will find various uses in conjunction with legacy mobile communication, very high-speed wireless Internet or Wireless Fidelity (Wi-Fi), and low-output communication solutions such as ZigBee and thus will extend beyond Business to Business (B2B) markets to Business to Customer (B2C) markets.

In the era of M2M communication, every machine equipped with a Subscriber Identity Module (SIM) card can be managed and controlled remotely because it is possible to transmit data to and receive data from the machine. For example, M2M communication is applicable to a very broad range including numerous terminals and equipment such as a car, a truck, a train, a container, an automatic vending machine, a gas tank, etc.

The M2M device can report necessary information to the BS in a long-term manner or can also report necessary information to the BS using event triggering. That is, while the M2M device mostly remains in an idle state, the M2M device is awoken into an active state at intervals of a long-term period or when an event has occurred. In addition, from among all M2M devices, whereas some M2M devices may be mounted to a moving object so that each M2M device has mobility, most M2M devices may have low mobility or no mobility. Thus, there is a need for the BS to identify each idle-state MS having no mobility.

However, a method for allocating an ID used only for idle-state MSs having no mobility has not yet been disclosed.

DETAILED DESCRIPTION OF THE INVENTION

Technical Problem

Accordingly, the present invention is directed to a method for allowing a base station (BS) to transmit an ID for an idle-state MS having no mobility.

An object of the present invention is to provide a method for allowing a mobile station (MS) to receive an ID for an idle-state MS having no mobility.

An object of the present invention is to provide a base station (BS) for transmitting an ID of an idle-state MS having no mobility.

An object of the present invention is to provide a mobile station (MS) for receiving an ID of an idle-state MS having no mobility.

Technical Solution

The object of the present invention can be achieved by providing a method for transmitting an identifier (ID) of an idle-state mobile station (MS) having no mobility by a base station (BS) in a wireless communication system, the method including: receiving mobility information from at least one MS; allocating an ID of the idle-state MS having no mobility for at least one idle-state MS having no mobility to the at least one idle-state MS having no mobility based on the mobility information; and transmitting the allocated ID to the at least one idle-state MS having no mobility.

In the allocating of the ID of the idle-state MS having no mobility, the ID of the idle-state MS having no mobility may be allocated as a first ID type based on a deregistration identifier (DID) or a S-Temporary Mobile Subscriber Identity (S-TMSI).

The method may further include: transmitting the received mobility information to a paging controller (PC) or a mobile management entity (MME). The method may further include: receiving, information regarding the ID allocated by the PC or MME for the idle-state MS having no mobility, from the PC or MME, where the idle-state MS ID has been allocated by the PC or MME, and wherein the allocating of the ID of the idle-state MS having no mobility includes allocating the ID of the idle-state MS having no mobility based on information of the ID allocated by the PC or MME. If a size of the ID allocated by the PC or MME is larger than a size of an ID contained in assignment information for data transmission to the at least one idle-state MS having no mobility, the allocating of the idle-state MS having no mobility may include allocating an ID of the idle-state MS having no mobility as a second ID type. The second ID type may be one-to-one mapped to the no-mobility idle-state MS ID allocated by the PC or MME. The ID of the at least one idle-state MS having no mobility may be discriminated only between MSs configured to receive services from the BS.

In another aspect of the present invention, a method for receiving an identifier (ID) of an idle-state mobile station (MS) having no mobility by a mobile station (MS) in a wireless communication system includes: transmitting mobility information to a base station (BS); and receiving an ID of the idle-state MS having no mobility for at least one idle-state MS having no mobility from the base station (BS) based on the mobility information.

The ID of the idle-state MS having no mobility may be allocated as a first ID type based on a deregistration identifier (DID) or an S-Temporary Mobile Subscriber Identity (S-TMSI). The mobility information may be transmitted when the MS performs network entry or re-entry or when the MS transits to an idle state. The mobility information may be transmitted through any one of a ranging request message, a registration request message, a basic capability request message, and a dynamic service message during the network entry or re-entry. The mobility information may be transmitted through a connection establishment message during the network entry or re-entry. The mobility information may be transmitted through a deregistration message or a connection release message when the MS transits to the idle state.

In another aspect of the present invention, a base station (BS) for transmitting an identifier (ID) of an idle-state mobile station (MS) having no mobility in a wireless communication system includes: a receiver configured to receive mobility information from at least one MS; a processor configured to allocate an ID of the idle-state MS having no mobility for at least one idle-state MS having no mobility to the at least one idle-state MS having no mobility based on the mobility information; and a transmitter for transmitting the allocated ID to the at least one idle-state MS having no mobility.

In another aspect of the present invention, a mobile station (MS) for receiving an identifier (ID) of an idle-state mobile station (MS) having no mobility in a wireless communication system includes: a transmitter configured to transmit mobility information to a base station (BS); and a receiver configured to receive an ID of the idle-state MS having no mobility for at least one idle-state MS having no mobility from the base station (BS) based on the mobility information.

Effects of the Invention

As is apparent from the above description, according to various embodiments, an ID for an idle-state MS having no mobility is allocated only to the idle-state MS, and is then transmitted to each idle-state MS having no mobility, such that the BS can efficiently identify each idle-state MS having no mobility.

In addition, only each idle-state MS having no mobility is identified according to the embodiments. As a result, the idle-state MS having no mobility is designed to perform only necessary steps from among all procedures of the network entry or re-entry, whereas the legacy MS must perform all procedures of the network entry or re-entry, resulting in improvement of communication performance and communication efficiency.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon an IEEE 802.16 system and 3GPP mobile communication system, but the present invention is not limited thereto and the remaining parts of the present invention other than unique characteristics of the IEEE 802.16 system and 3GPP system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS), an Advanced Mobile Station (AMS) and the like. Also, the eNode B (eNB) may refer to an arbitrary node of a network end which communicates with the above terminal, and may include a base station (BS), a Node B (Node-B), an eNode B, an access point (AP) and the like.

In a mobile communication system, the UE may receive information from the eNode B via downlink, and may transmit information via uplink. The information that is transmitted and received to and from the UE includes data and a variety of control information. There are a variety of physical channels according to categories of transmission (Tx) and reception (Rx) information of the UE.

Figure 1:
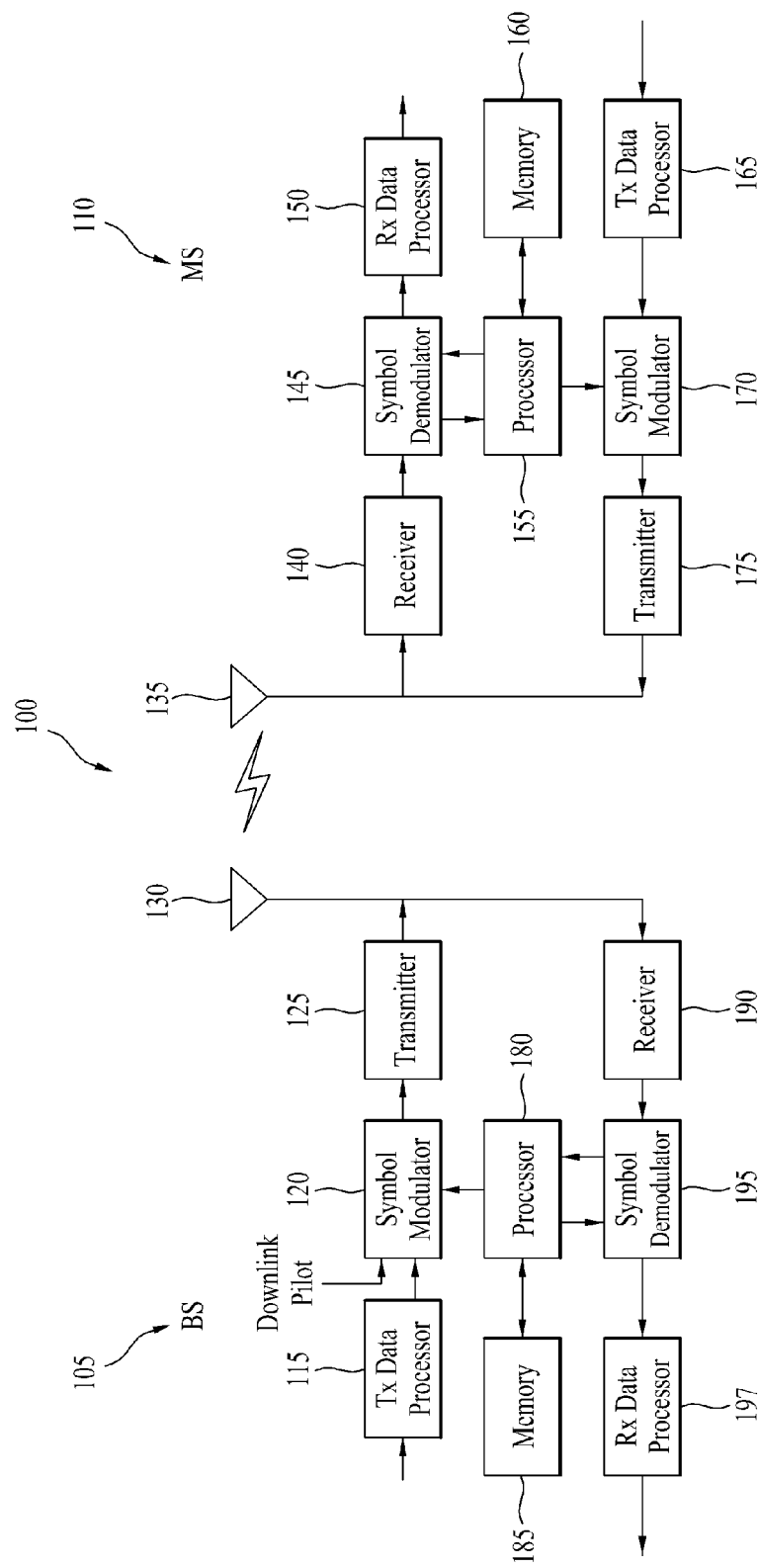
FIG. 1 is a block diagram illustrating a base station (BS) and a mobile station (MS) for use in a wireless communication system.

FIG. 1 is a block diagram illustrating a base station (BS) 105 and a mobile station (MS) 110 for use in a wireless communication system 100.

Referring to FIG. 1, while one BS 105 and one MS 110 are shown to simplify the configuration of the wireless communication system 100, the wireless communication system 100 may include one or more BSs and/or one or more MSs in actual implementation.

Referring to FIG. 1, the BS 105 may include a Transmission (Tx) data processor 115, a symbol modulator 120, a transmitter 125, a Transmission/Reception (Tx/Rx) antenna 130, a processor 180, a memory 185, a receiver 190, a symbol demodulator 195, and an Rx data processor 197. The MS 110 may include a Tx data processor 165, a symbol modulator 170, a transmitter 175, a Tx/Rx antenna 135, a processor 155, a memory 160, a receiver 140, a symbol demodulator 145, and an Rx data processor 150. While each of the BS 105 and the MS 110 is shown as having one Tx/Rx antenna 130 or 135, each may include a plurality of Tx/Rx antennas. Accordingly, the BS 105 and the MS 110 support Multiple Input Multiple Output (MIMO) according to the present invention. The BS 105 may also support both Single User MIMO (SU-MIMO) and Multi-User MIMO (MU-MIMO) according to the present invention.

The Tx data processor 115 receives traffic data, formats the received traffic data, and subjects the formatted traffic data to encoding, interleaving, and modulation, thus producing modulation symbols ("data symbols") on downlink. The symbol modulator 120 receives the data symbols and pilot symbols, processes the received data symbols and pilot symbols, and thus provides a stream of symbols.

After multiplexing the data symbols with the pilot symbols, the symbol modulator 120 transmits the multiplexed symbols to the transmitter 125. Each transmission symbol may be a data symbol, a pilot symbol, or a null signal. The pilot symbols may be transmitted contiguously during each symbol period. The pilot symbols may be multiplexed according to Frequency Division Multiplexing (FDM), Orthogonal Frequency Division Multiplexing (OFDM), Time Division Multiplexing (TDM), or Code Division Multiplexing (CDM).

The transmitter 125 receives the symbol stream, converts the received symbol stream into one or more analog signals, and additionally adjusts the analog signals (e.g. amplification, filtering, and frequency upconversion), thus generating a downlink signal suitable for transmission on a radio channel. Then the Tx antenna 130 transmits the downlink signal to the MS.

In the configuration of the MS 110, the Rx antenna 135 provides the downlink signal received from the BS to the receiver 140. The receiver 140 adjusts the received signal (e.g. by filtering, amplification, and frequency down-conversion) and acquires samples by digitizing the adjusted signal. The symbol demodulator 145 demodulates the received pilot symbols and provides the demodulated pilot symbols to the processor 155, for use in channel estimation.

In addition, the symbol demodulator 145 receives a frequency response estimate for the downlink from the processor 155, acquires data symbol estimates (i.e. estimates of the transmitted data symbols) by demodulating the received data symbols, and provides the data symbol estimates to the Rx data processor 150. The Rx data processor 150 recovers the transmitted traffic data by subjecting the data symbol estimates to demodulation (i.e. symbol demapping), deinterleaving, and decoding.

The operations of the symbol demodulator 145 and the Rx data processor 150 are complementary to those of the symbol modulator 120 and the Tx data processor 115 in the BS 105.

In the MS 110, the Tx data processor 165 produces data symbols on uplink by processing traffic data. The symbol modulator 170 multiplexes the data symbols received from the Tx data processor 165, modulates the multiplexed data symbols, and provides a stream of symbols to the transmitter 175. The transmitter 175 generates an uplink signal by receiving and processing the stream of symbols and the Tx antenna 135 transmits the uplink signal to the BS 105.

In the BS 105, the uplink signal is received from the MS 110 through the Rx antenna 130. The receiver 190 acquires samples by processing the received uplink signal. The symbol demodulator 195 provides estimates of pilot symbols and data symbols received on uplink by processing the samples. The Rx data processor 197 recovers the traffic data transmitted by the UE 110 by processing the data symbol estimates.

The processor 155 of the MS 110 and the processor 180 of the BS 105 instruct (e.g. control, adjust, and manage) operations of the MS 110 and the BS 105, respectively. The processors 155 and 180 may be connected respectively to the memories 160 and 185 that store program code and data. The memories 160 and 185 store Operating Systems (OSs), applications, and general files in connection to the processors 155 and 180.

The processors 155 and 180 may be called controllers, microcontrollers, microprocessors, microcomputers, etc. Meanwhile, the processors 155 and 180 may be implemented as hardware, firmware, software, or a combination thereof. In a hardware configuration, the processors 155 and 180 may be provided with Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. which are configured to implement the present invention.

In a firmware or software configuration, embodiments of the present invention may be implemented in the form of a module, a procedure, a function, etc. Firmware or software configured to implement the present invention may reside in the processors 155 and 180 or may be stored in the memories 160 and 185 and executed by the processors 155 and 180.

The layers of radio interface protocols between an MS 110 and a BS 105 may be classified into Layers 1, 2 and 3 (L1, L2 and L3) based on the three lowest layers of the Open System Interconnection (OSI) model. A physical layer corresponds to L1 and provides information transfer services on physical channels. A Radio Resource Control (RRC) layer corresponds to L3 and provides radio control resources between the MS and the network. The MS/BS may exchange RRC messages with the wireless communication network through the RRC layer.

Such a terminal that communicates in an M2M scheme as described above can be referred to as an M2M device, an M2M communication terminal, or a Machine Type Communication (MTC) terminal. On the other hand, a conventional MS may be referred to as a Human Type Communication (HTC) MS.

M2M devices will gradually increase in number in a given network as machine application types thereof increase. Machine application types under consideration are (1) security; (2) public safety; (3) tracking and tracing; (4) payment; (5) healthcare; (6) remote maintenance and control; (7) metering; (8) consumer devices; (9) fleet management in Point Of Sale (POS)-related and security-related application markets; (10) M2M communication at a vending machine; (11) remote control of machines and facilities and smart metering for automatically measuring the operation time of construction equipment and facilities and heat or power consumption; and (12) surveillance video communication, which should not be construed as limiting the present invention. Besides, many other machine application types are being discussed. As the number of machine application types increases, the number of M2M communication devices can rapidly increase compared to the number of conventional mobile communication devices.

As described above, the M2M device may mainly transmit traffic data to the BS in a long-term manner, or may also transmit such data to the BS using event triggering. That is, while the M2M device mostly remains in an idle state, the M2M device is awoken into an active state at intervals of a long-term period or when an event has occurred. In addition, from among all M2M devices, most M2M devices may have low mobility or no mobility. As the application types of M2M devices having no mobility are continuously increased in number, the number of M2M devices managed by the same BS is also rapidly increased. Thus, it may be necessary for the BS to use an identifier (ID) for an idle-state MS (or device) having no mobility (or fixed) so that the BS can identify each idle-state MS having no mobility using the identifier (ID).

Prior to describing a method for transmitting/receiving downlink data for an idle-state MS having no mobility according to the present invention, an identifier to be used for discriminating among legacy MSs in a wireless communication system will hereinafter be described in detail. In this case, a method for transmitting a PDCCH from the BS to the MS for use in a 3GPP LTE system will hereinafter be described in detail.

The BS determines a PDCCH format according to Downlink Control Information (DCI) to be sent to the MS, and attaches a Cyclic Redundancy Check (CRC) to control information. A unique identifier (e.g., a Radio Network Temporary Identifier (RNTI)) is masked onto the CRC according to PDCCH owners or utilities. Meanwhile, the term "Station Identifier (STID)" corresponding to a RNTI of 3GPP in an IEEE 802.16m system will hereinafter be used for convenience of description.

In case of a PDCCH for a specific MS, a unique ID of an MS, for example, C-RNTI (Cell-RNTI) may be masked onto CRC. Alternatively, in case of a PDCCH for a paging message, a paging indication ID (for example, R-RNTI (Paging-RNTI)) may be masked onto CRC. In case of a PDCCH for system information (SI), a system information ID (i.e., SI-RNTI) may be masked onto CRC. In order to indicate a random access response acting as a response to an MS's random access preamble transmission, RA-RNTI (Random Access-RNTI) may be masked onto CRC. The following Table 1 shows examples of IDs masked onto PDCCH.

TABLE 1

| Type | Identifier | Description |
| --- | --- | --- |
| UE-specific | C-RNTI | used for the UE corresponding to the C-RNTI. |
| Common | P-RNTI | used for paging message. |
|  | SI-RNTI | used for system information (It could be differentiated according to the type of system information). |
|  | RA-RNTI | used for random access response (It could be differentiated according to subframe or PRACH slot index for UE PRACH transmission). |
|  | TPC-RNTI | used for uplink transmit power control command (It could be differentiated according to the index of UE TPC group). |

If C-RNTI is used, PDCCH may carry control information for a specific MS. If another RNTI is used, PDCCH may carry common control information that is received by all or some MSs contained in the cell. The BS performs channel coding of the CRC-added DCI so as to generate coded data. The BS performs rate matching according to the number of CCEs allocated to a PDCCH format. Thereafter, the BS modulates the coded data so as to generate modulated symbols. In addition, the BS maps the modulated symbols to physical resource elements. As described above, the BS uses an RNTI as an MS ID in case of an LTE system, and uses an STID as an MS ID in case of an IEEE 802.16 system.

Prior to describing a method for transmitting/receiving downlink data to/from an idle-state MS having no mobility according to the present invention, an idle state or an idle mode will hereinafter be described in detail. The idle state or idle mode generally allows the MS to periodically transmit downlink broadcast traffic data without being registered with a specific BS when the MS moves in a radio link environment in which multiple BSs are present. The MS may transit (or switch) to the idle mode in order to achieve power saving when the MS has not received traffic data from a BS for a predetermined time. The MS, which has transited to the idle mode, may receive a broadcast message (for example, a paging message) broadcast by the BS during an Available Interval (AI) and determine whether the MS will transit to the normal mode or remain in the idle state. In addition, the idle-state MS performs location update so that it can inform the paging controller of the location of the idle-state MS.

In the idle state, it is possible to give a benefit to the MS by removing handover-related activation requirements and general operation requirements. In the idle state, it is possible to give a benefit to the network or the BS by providing a simple and appropriate method of enabling the network or the BS to notify the MS of pending downlink traffic data and removing a radio interface and network handover (HO) traffic data from an inactive MS.

The term "paging" refers to a function to determine the location of an MS (for example, a BS or a switching center) when a terminated call for the MS is generated during mobile communication. A number of BSs that support the idle state or the idle mode may belong to a specific paging group and constitute a paging area. Here, the paging group is a logical group. The purpose of the paging group is to provide an adjacent region that enables paging in downlink when traffic destined for the MS is present. It is preferable that the paging group be configured so as to satisfy a condition that the paging group is large enough that the MS is mostly present within the same paging group and a condition that the paging group is small enough to keep paging load at an appropriate level.

The paging group may include one or more BSs and one BS may be included in one or more paging groups. The paging group is defined in a management system. A paging group-action backbone network message may be used in the paging group. The paging controller may manage initial paging of all base stations belonging to the paging group and manage a list of MSs, which are in an idle state, using a paging-announce message which is a backbone message.

A procedure for network entry (or network re-entry) interaction between a legacy MS and an idle-state MS will hereinafter be described with reference to an ID and a paging message of the legacy MS. For convenience of description and better understanding of the present invention, the IEEE 802.16 system will hereinafter be used as an example.

Figure 2:
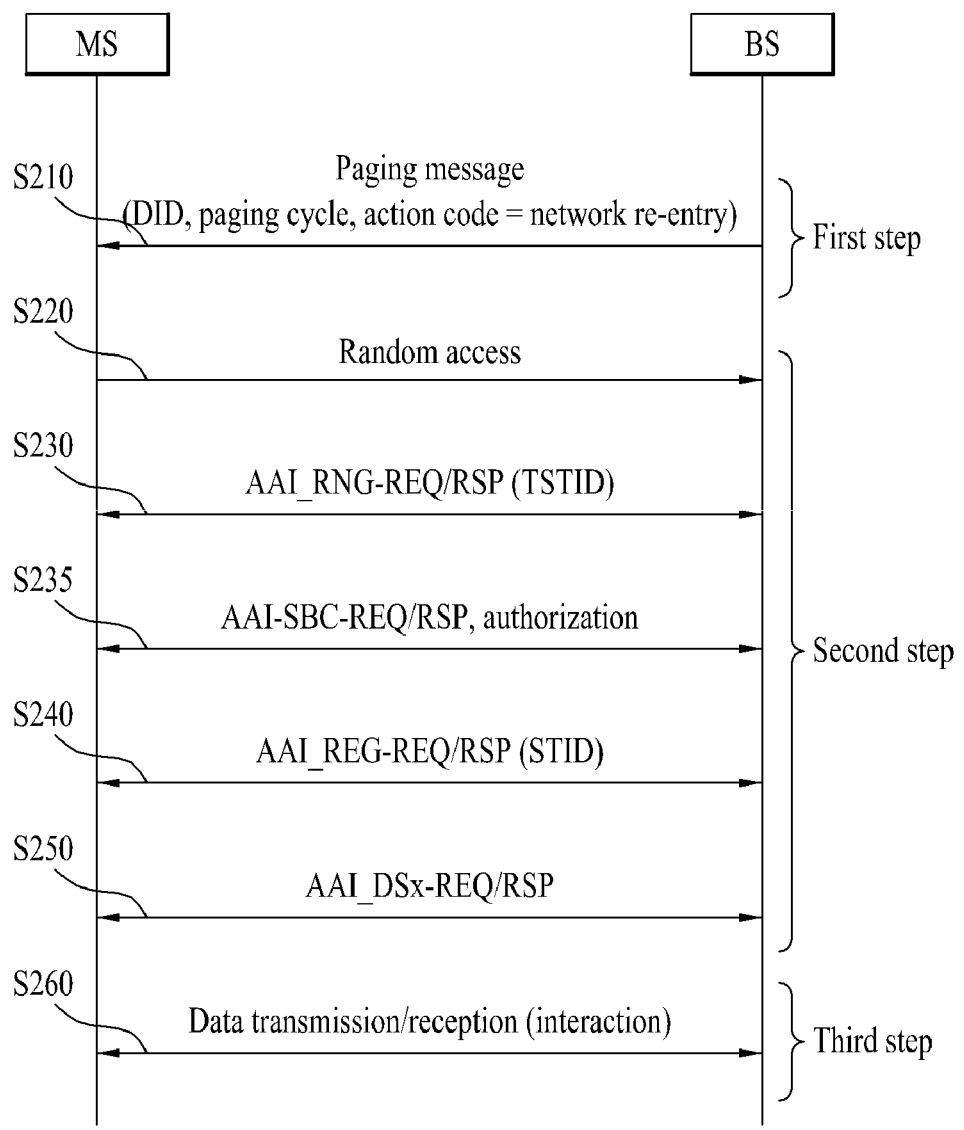
FIG. 2 is a flowchart illustrating operations for interaction between a BS and an idle-state MS upon completion of the network entry or re-entry between the BS and the idle-state MS.

FIG. 2 is a flowchart illustrating operations for interaction between a BS and an idle-state MS upon completion of the network entry or re-entry between the BS and the idle-state MS.

Referring to FIG. 2, the BS does not recognize a correct location of each idle-state MS configured to transmit/receive data, such that all BSs of the same paging group need to transmit a paging message for requesting the network re-entry to the corresponding MSs. Therefore, for interaction with each idle-state MS, the BS contained in the same paging group including MS(s) transmits a paging message requesting network entry to the MSs during the listening interval of the corresponding MS(s) in step S210.

If paging message includes MS information (for example, at least one of a paging group ID (PGID), a deregistration ID (DID) and a paging cycle) is contained in the paging message, the MS needs to transit to an active state in step S220. In other words, the idle-state MS may perform random access for network entry in step S220. For example, the idle-state MS for use in the IEEE 802.16 system can perform the network re-entry procedures such as ranging, basic capability negotiation, registration, etc. Meanwhile, the idle-state MS for use in the LTE system can perform an RRC connection (re)establishment procedure. Here, whereas the BS for use in the IEEE 802.16 system allocates a TSTID, an STID, and an MTC group ID to the idle-state MS attempting to perform network re-entry, the BS for use in the 3GPP LTE or LTE-A system can allocate an RNTI and an MTC group ID to the idle-state MS attempting to perform network re-entry.

That is, the idle-state MS transmits a ranging request message (for example, AAI-RNG-REQ) to the BS, and transmits a ranging response message (for example, AAI-RNG-RSP) including a temporary STID (TSTID)) to the idle-state MS in step S230.

The idle-state MS can exchange SBC-REQ/RSP messages with the BS, and can perform an authorization process with the BS in step S235.

Thereafter, the idle-state MS transmits a registration request message (for example, AAI-REG-REQ) to the BS, allocates an STID to the idle-state MS in response to the AAI-REG-REQ message, includes the STID in a registration response message (for example, AAI-REQ-RSP) to the idle-state MS, and transmits the resultant AAI-REQ-RSP message in step S240.

Subsequently, the idle-state MS may exchange dynamic-service associated messages with the BS in step S250. Thereafter, the idle-state MS and the BS can transmit/receive DL and UL data in step S260.

In association with FIG. 2, since the BS does not recognize the correct positions of idle-state MSs, all BSs contained in the same paging group must transmit a paging message. In this case, the BS should include parameters (for example, a DID, a paging cycle, and an action code for use in the IEEE 802.16m system) for each paged MS in the paging message, so that downlink overhead may unavoidably occur.

In addition, the idle-state MS having received a paging message from the BS performs random access. In this case, when the idle-state MSs attempt to perform random access, uplink interference occurs and the possibility of generating collision between MSs attempting to perform random access may unavoidably increase.

In addition, the BS assigns an ID for identifying an active MS to the corresponding MS, so that it requires a large number of unique IDs.

However, since the idle-state MS having no mobility does not move to another BS, the BS need not recognize the correct location (or position) of the idle-state MS, so that the BS need not transmit a paging message to the idle-state MS. The BS has already recognized the correct position of the idle-state MS, such that the idle-state MS having no mobility need not perform random access. As a result, it is necessary to re-design the network entry or re-entry process in consideration of characteristics of the idle-state MS having no mobility.

For this purpose, the BS needs to recognize which MS has mobility. Therefore, there is a need for the MS to inform the BS of MS mobility information that indicates not only the presence or absence of mobility but also specific information as to whether mobility is high or low. Thus the BS receives mobility information from each MS so that it can recognize the presence or absence of mobility for each MS. There is a need for the BS to allocate an ID to the idle-state MS having no mobility so as to identify only each idle-state MS having no mobility.

In this case, in order to minimize influence upon a Human Type Communication (HTC) device, the BS may use IDs (for example, CID for IEEE 802.16e, STID for IEEE 802.16m, and RNTI for 3GPP LTE) different from those of the legacy HTC MS as IDs for the idle-state MSs having no mobility.

Figure 3:
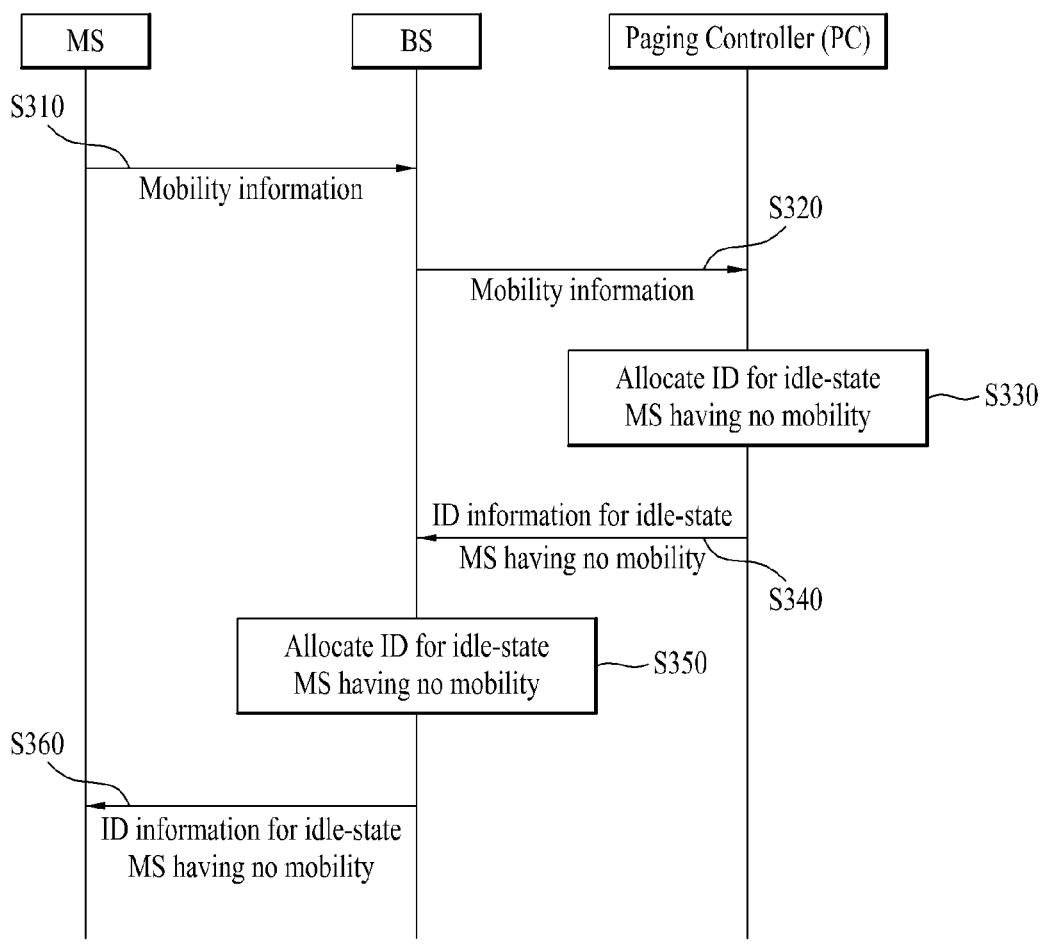
FIG. 3 is a flowchart illustrating a method for allocating an ID for an idle-state MS having no mobility according to one embodiment of the present invention.

FIG. 3 is a flowchart illustrating a method for allocating an ID for an idle-state MS having no mobility according to one embodiment of the present invention.

Referring to FIG. 3, when the MS performs network entry (or network re-entry) or transits to an idle state, the MS may transmit MS mobility information to the BS in step S310. That is, the MS may transmit its own mobility information, that indicates not only the presence or absence of MS mobility but also specific information as to whether the MS has low mobility, to the BS in step S310.

In the case of an MS for the IEEE 802.16 system, MS mobility information can be transmitted through any one of a ranging request message for a network entry (or re-entry) procedure, a registration request message, a basic capability request message, and a dynamic service message. Meanwhile, an MS for use in the 3GPP system may transmit MS mobility information through a network connection establishment message in a network connection establishment (or reconfiguration) procedure.

In addition, the MS for the IEEE 802.16 system may transmit MS mobility information through a deregistration message switching to an idle state, and the MS for the 3GPP system may transmit such MS mobility information through a connection release message.

On the other hand, when the MS having no mobility transits to an idle state, the BS can inform the paging controller (PC) or MME (Mobile Management Entity) of specific information indicating that the corresponding MS has no mobility in step S320.

Thereafter, the paging controller (PC) or the MME can allocate the idle-state MS ID for each no-mobility idle-state MS to be managed by the PC or MME in step S330. The paging controller (PC) can allocate the size of 22 bits to an ID of each no-mobility idle-state MS to be managed by the PC using a predefined DID and a paging cycle in step S330. Meanwhile, the MME may allocate the size of 40 bits to an ID of each no-mobility idle-state MS to be managed by the MME using the predefined S-TMSI in step S330.

The PC or MME can transmit ID information for each idle-state MS having no mobility to the BS in step S340. When the PC or MME desires to communicate with the corresponding MS, it can transmit an indication message only to the last BS of the corresponding MS instead of all BSs contained in the same paging group.

For only the idle-state MSs having no mobility, the processor 180 of the BS can allocate an ID for each no-mobility idle-state MS based on mobility information received from each MS in step S350. In this case, the BS processor 180 may allocate an ID for each no-mobility idle-state MS to be managed by the BS by reusing an ID (for example, DID & paging cycle in case of the IEEE 802.16 system, and S-TMSI in case of the 3GPP system) defined in the legacy system, or may allocate the ID by defining a new ID in step S350. Since the MS having no mobility does not move to another BS, the BS processor 180 must allocate a unique ID to each MS in such a manner that the BS can be distinguished from another MS having no mobility only in the BS (i.e., the last BS) instead of the paging group. Therefore, the ID for the idle-state MS can be simultaneously allocated to no-mobility idle-state MSs managed by other BSs.

A method for allowing the BS processor 180 to allocate an ID for each no-mobility idle-state MS using a newly defined ID will hereinafter be described in detail. The newly defined ID is an ID that is allocated to a no-mobility MS to be switched to an idle state by the BS. For example, the newly defined ID may be referred to as a Temporary No Mobility Subscriber Identifier (TNMSID) or the like. The term "TNMSID" is disclosed only for illustrative purposes, but is not limited thereto, and can also be referred to other terms as necessary.

If the size of an idle-state MS ID (for example, DID & paging cycle for IEEE 802.16 system, and S-TMSI for 3GPP system) allocated by the paging controller (PC) or MME is larger than the size of an ID used in assignment information of a data burst to be transferred from the BS, the BS may use the newly defined ID (TNMSID) as an ID of the idle-state MS having no mobility. The ID used in the data burst assignment information indicates which MS is used for the corresponding assignment information, and the corresponding ID is masked onto a CRC included in the assignment information. Accordingly, the processor 155 of the idle-state MS having no mobility recognizes that the data burst transmitted after MS ID has been masked onto the CRC of the assignment information is used for the idle-state MS, so that the processor 155 decodes the data burst.

As described above, the newly defined TNMDID allocated by the BS is different from an ID allocated by the PC or MME. Accordingly, the BS processor 180 may map the TNMSID of the corresponding MS to the corresponding MS ID allocated by the PC or MME on a one to one basis. As a result, an ID (for example, DID & paging cycle or S-TMSI) for a no-mobility idle-state MS to be managed by the PC or MME is uniquely one-to-one mapped to a TNMSID for a no-mobility idle-state MS to be managed by the BS.

Preferably, TNMSID that is newly defined and allocated by the BS processor 180 may not be allocated as a specific value.

For example, specific values to be prevented from the TNMSID in the 3GPP system may be 0xFFFE used as P-RNTI, 0xFFFF to be used as SI-RNTI, and an RNTI for transmitting information indicating assignment or non-assignment only for the idle-state MSs having no mobility.

In another example, specific values to be prevented from the TNMSID in the IEEE 802.16 system may be a masking prefix value '0b1' used as RAID, a masking prefix value '0x1000' used as 'Broadcast Assignment for broadcast or ranging channel assignment', a masking prefix value '0x1001' used as ACK for BR, a special-purposed masking prefix value '0x2FFF' used as 'Broadcast Assignment for multicast assignment', a type indicator, a masking code value, etc.

In addition, the BS processor 180 may control some parts of TNMSIDs to be allocated as a group ID of the idle-state MSs having no mobility.

Finally, the BS may transmit information regarding an ID of the idle-state MS having no mobility to the MS in step S360. That is, the BS may separately allocate an ID allocated for each idle-state MS having no mobility in step S360. Each idle-state MS having no mobility recognizes whether control information transmitted from the BS is used for the idle-state MS based on ID information of the idle-state MS. If it is determined that the control information is transmitted to the idle-state MS, a decoding step is carried out.

On the other hand, steps S320~S340 shown in FIG. 3 are optional but not mandatory. For example, provided that the MS transmits mobility information to the BS in step S310, the BS does not transmit mobility-related information to the paging controller (PC) or MME, and may allocate a no-mobility idle-state MS ID only for the idle-state MSs having no mobility.

Figure 4A:
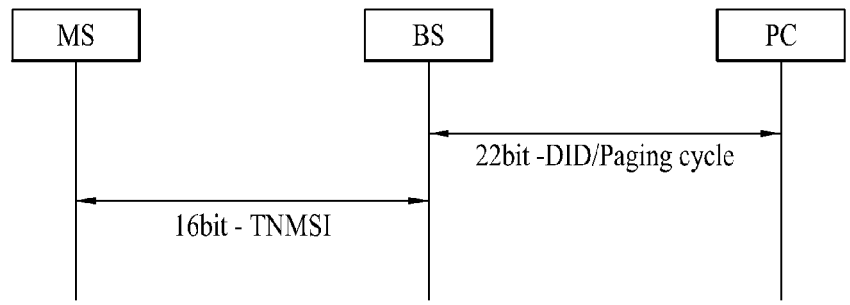
FIGS. 4A to 4C are flowcharts illustrating the relationship between an ID managed by a PC (or MME) for an idle-state MS having no mobility and an ID managed by a BS.
Figure 4B:
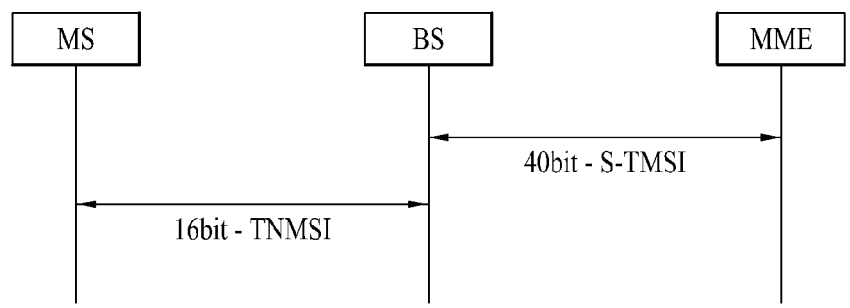
Figure 4C:
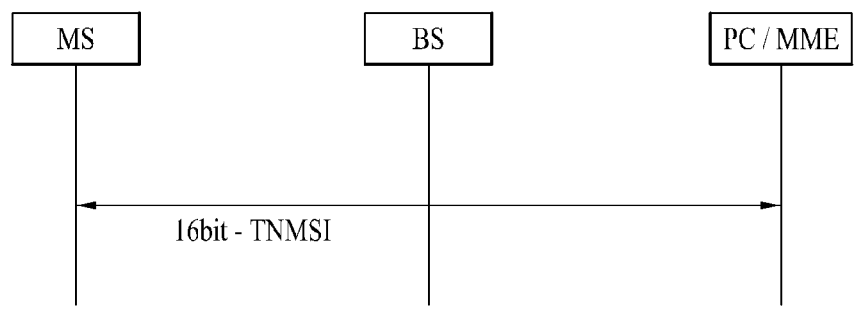

FIGS. 4A to 4C are flowcharts illustrating the relationship between an ID managed by a PC (or MME) for an idle-state MS having no mobility and an ID managed by a BS.

Referring to FIGS. 4A and 4B, in the step 320, the paging controller (PC) having received mobility information of the MS switching to an idle state from the BS can allocate an ID for the no-mobility idle-state MS to be managed by the PC. In this case, the paging controller (PC) may allocate the no-mobility idle-state MS ID of 22 bits using the DID and paging cycle defined in the legacy system. Meanwhile, the MME having received mobility information of the MS switching to the idle state from the BS can allocate an ID for a no-mobility idle-state MS to be managed by the MME. The MME may allocate a 40-bit ID for a no-mobility idle-state MS to be managed by the MME using a S-TMSI defined in the legacy system.

22 bits allocated by the paging controller (PC) or 40 bits allocated by the MME are larger than the size of an ID used in data burst assignment information to be transmitted from the BS. Therefore, the BS processor 180 may allocate a newly defined ID (TNMSID) as an ID for the idle-state MS having no mobility. In this case, the TNMSID may be 16 bits long. By the BS processor 180, a 16-bit TNMSID newly assigned by the BS is one-to-one mapped to either a 22-bit ID allocated by the PC or MME or a 40-bit ID.

Referring to FIG. 4C, the BS processor 180 may share information regarding a newly defined ID (TNMSID) acting as an ID of the idle-state MS having no mobility with the PC or MME. Therefore, not only the BS but also the PC or MME may manage an ID of the idle-state MS having no mobility as a TNMSID of 16 bits.

Figure 5:
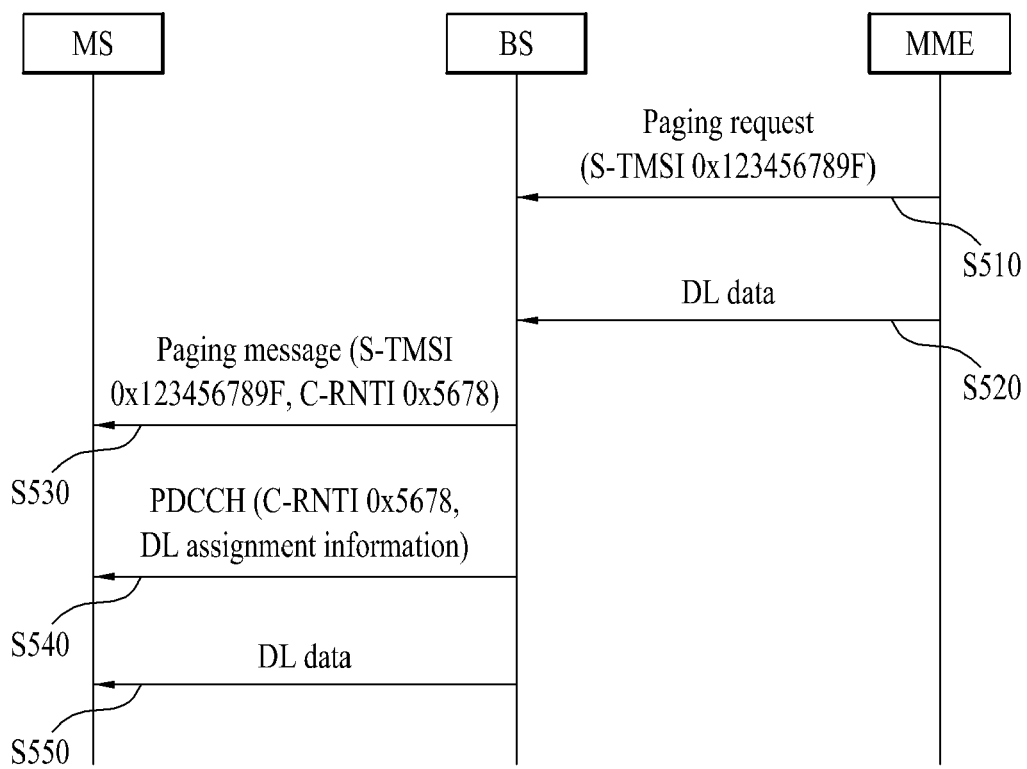
FIG. 5 is a flowchart illustrating a method for allocating an ID for an idle-state MS having no mobility in a 3GPP LTE system.

FIG. 5 is a flowchart illustrating a method for allocating an ID for an idle-state MS having no mobility in a 3GPP LTE system.

FIG. 5 is a method for allocating an ID to be temporarily used for DL data transmission to a no-mobility idle-state MS including DL data inserted in a paging message. Referring to FIG. 5, the MME may transmit a paging request message to the BS in step S510. In this case, the paging message may include an S-TMSI. For example, the S-TMSI may be 0x123456789F. Thereafter, the MME may transmit downlink (DL) data to the BS in step S520.

The BS can transmit the paging message to the no-mobility idle-state MS including DL data to be transmitted in step S530. In this case, the paging message may include S-TMSI, C-RNTI, etc. For example, S-TMSI may be 0x123456789F, and C-RNTI may be 0x5678. The BS performs CRC masking onto C-RNTI (0x5678) temporarily allocated to the corresponding MS, and transmits a PDCCH including DL assignment information to the MS in step S540. As a result, the MS having received C-RNTI '0x5678' receives a PDCCH including DL assignment information obtained when the C-RNTI '0x5678' is CRC-masked, from the BS, and decodes DL data transmitted through a DL resource indicated by the PDCCH in step S550. Upon completion of DL data transmission, the BS releases the temporarily allocated C-RNTI.

As described above, according to various embodiments, an ID for an idle-state MS having no mobility is allocated only to the idle-state MS, and is then transmitted to each idle-state MS having no mobility, such that the BS can efficiently identify each idle-state MS having no mobility.

In addition, only each idle-state MS having no mobility is identified according to the embodiments. As a result, the idle-state MS having no mobility is designed to perform only necessary steps from among all procedures of the network entry or re-entry, whereas the legacy MS must perform all procedures of the network entry or re-entry, resulting in improvement of communication performance and communication efficiency.

Exemplary embodiments described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. Also, it will be obvious to those skilled in the art that claims that are not explicitly cited in the appended claims may be presented in combination as an exemplary embodiment of the present invention or included as a new claim by subsequent amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The method and apparatus for transmitting and receiving DL data for the idle-state MS having no mobility according to the embodiments of the present invention can be applied to various mobile communication systems, for example, 3GPP LTE, LTE-A, IEEE 802, and the like.

The invention claimed is:

1. A method of allocating an identifier for a fixed Machine to Machine (M2M) device in a wireless communication system, the method comprising:
   assigning, by a base station, an identifier for the fixed M2M device during an idle mode entry;
   transmitting, by the base station to the fixed M2M device, the identifier assigned to the fixed M2M device; and
   transmitting, by the base station to the fixed M2M device, control information including the identifier assigned to the fixed M2M device,
   wherein the control information comprise resource assignment, and
   wherein the identifier assigned to the fixed M2M device is unique in a domain of the base station while the identifier assigned to the fixed M2M device is not unique in a domain of a network including the base station and another base station.

2. The method of claim 1, wherein a size of the identifier assigned to the fixed M2M device is 16 bits.

3. The method of claim 1, wherein the identifier assigned to the fixed M2M device is a deregistration identifier.

4. The method of claim 3, wherein the deregistration identifier is transmitted through a deregistration message.

5. A method of receiving identifier information in a wireless communication system, the method comprising:
   receiving, by a fixed Machine to Machine (M2M) device from a base station, an identifier assigned to the fixed M2M device; and
   using, by the fixed M2M device, the identifier assigned to the fixed M2M device to receive control information from the base station,
   wherein the control information comprise a resource assignment,
   wherein the identifier is assigned by the base station to the fixed M2M device during an idle mode entry, and
   wherein the identifier assigned to the fixed M2M device is unique in a domain of the base station while the identifier assigned to the fixed M2M device is not unique in a domain of a network including the base station and another base station.

6. The method of claim 5, wherein a size of the identifier assigned to the fixed M2M device is 16 bits.

7. The method of claim 5, wherein the identifier assigned to the fixed M2M device is a deregistration identifier.

8. The method of claim 5, wherein the identifier assigned to the fixed M2M device is received through a deregistration message.

9. A base station of assigning an identifier for a fixed Machine to Machine (M2M) device in a wireless communication system, the base station comprising:
   a processor configured to assign an identifier to the fixed M2M device during an idle mode entry; and
   a transmitter configured to transmit, to the fixed M2M device,
      the identifier assigned to the fixed M2M device, and
      control information that includes the identifier assigned to the fixed M2M device,
   wherein the control information comprises resource assignment, and
   wherein the identifier assigned to the fixed M2M device is unique in a domain of the base station while the identifier assigned to the fixed M2M device is not unique in a domain of a network including the base station and another base station.

10. A fixed Machine to Machine (M2M) device of receiving identifier information in a wireless communication system, the fixed M2M device comprising:

a receiver; and a processor, wherein the processor is configured to control the receiver such that the receiver receives, from a base station, an identifier assigned to the fixed M2M device, and uses the identifier assigned to the fixed M2M device to receive control information from the base station, wherein the control information comprises resource assignment, and wherein the identifier assigned to the fixed M2M device is allocated by the base station during an idle mode entry, and wherein the identifier assigned to the fixed M2M device is unique in a domain of the base station while the identifier assigned to the fixed M2M device is not unique in a domain of a network including the base station and another base station.

* * * * *